(12) United States Patent
Podnar et al.

(10) Patent No.: US 7,877,692 B2
(45) Date of Patent: Jan. 25, 2011

(54) ACCESSIBLE DISPLAY SYSTEM

(75) Inventors: Paul J. Podnar, Cleveland, OH (US);
Gregg W. Podnar, Pittsburgh, PA (US)

(73) Assignee: Accommodata Corporation, Cleveland, OH (US)

( * ) Notice: Subject to any disclaimer, the term of this patent is extended or adjusted under 35 U.S.C. 154(b) by 169 days.

(21) Appl. No.: 11/610,947

(22) Filed: Dec. 14, 2006

(65) Prior Publication Data

US 2007/0132768 A1   Jun. 14, 2007

Related U.S. Application Data

(60) Provisional application No. 60/750,228, filed on Dec. 14, 2005.

(51) Int. Cl.
 *G06F 3/00* (2006.01)
(52) U.S. Cl. ..................................... 715/741
(58) Field of Classification Search ................ 715/740, 715/741, 751, 752, 742, 743, 753
See application file for complete search history.

(56) References Cited

U.S. PATENT DOCUMENTS

| 6,212,547 B1* | 4/2001 | Ludwig et al. .............. 709/204 |
| 6,624,827 B1* | 9/2003 | Hwang et al. ............... 715/753 |
| 6,708,172 B1* | 3/2004 | Wong et al. .................... 707/10 |
| 7,296,233 B2* | 11/2007 | Tan et al. ..................... 715/741 |
| 2003/0093670 A1* | 5/2003 | Matsubayashi et al. ...... 713/168 |
| 2004/0085354 A1* | 5/2004 | Massand ..................... 345/751 |
| 2006/0203758 A1* | 9/2006 | Tee et al. ..................... 370/315 |

* cited by examiner

*Primary Examiner*—Thanh T Vu
(74) *Attorney, Agent, or Firm*—Tucker Ellis & West LLP (57) ABSTRACT

The subject application is directed to display means adapted to interface with multiple personal electronic devices, such as personal data assistants, cellular telephones, laptops, and the like. An accessible display system includes shared display means and access control means in data communication with the shared display means. The access control means is in data communication with multiple associated mobile computing devices and selectively allows access to the shared display means from the associated mobile computing devices. The shared display means includes at least one of: a display of a fixed computing device, a display of a mobile computing device, and a mobile display, and is adapted for providing feedback to the associated mobile or fixed computing devices. The access control means may be built directly into a desktop computer or into a mobile monitor, or may be a stand alone device.

23 Claims, 4 Drawing Sheets

ACCESSIBLE DISPLAY SYSTEM

CROSS-REFERENCE TO RELATED APPLICATIONS

This application is based on and claims priority to provisional U.S. patent application Ser. No. 60/750,228, which was filed on Dec. 14, 2005 and which is related to U.S. Provisional Patent Application No. 60/645,339 filed Jan. 20, 2005, titled, "ACCESSIBLE MONITOR".

BACKGROUND OF THE INVENTION

The subject application is directed to display means suitably adapted to interface with a plurality of personal electronic devices. In particular, the subject application is directed to an accessible display system, capable of providing input and output functionality to a plurality of mobile handheld and wearable computing devices, such as personal data assistants, cellular telephones, laptops, and the like.

In recent years, computers have become much more powerful and the subsystems which support them such as hard drives, main CPU's, power supplies, batteries, video cards, modems, and the like, have gotten much smaller allowing the possibility of handheld/wearable products. However, a full featured wearable/handheld computer in the hands of a user results in at least two significant problems. The first such problem is the lack of adequate input devices, such as a mouse, keyboard, number pad, and the like. Typically, an add-on keyboard must be carried by the user to enable faster and easier input. A second, and more apparent problem, is the limited size of the viewing screen inherent in portable handheld devices.

SUMMARY OF THE INVENTION

In accordance with the subject application, there is provided an accessible display system to be used by a user of a computing device, preferably, of a user of a mobile computing device whenever it is desired to access a larger screen, additional input and output devices, network connections, and the like.

Further, in accordance with the subject application, there is provided an accessible display system capable of implementation in kiosks, bus stations, phone booths, airports, building lobbies, etc., to which the services would be available at a cost.

Still further, in accordance with the subject application, there is provided an accessible display system allowing for fast and convenient access to a full size display mobile display from a fixed computing device, such as a desktop or mainframe computer, and the like.

In accordance with one embodiment of the subject application, there is provided an accessible display system including shared display means and access control means. The access control means is in data communication with the shared display means. The access control means is further in data communication with at least one associated computing device. The access control means is adapted for selectively allowing access to the shared display means by at least one associated computing device. The shared display means is adapted for providing feedback to at least one associated computing device.

In one embodiment, the shared display means includes at least one of: a display of a fixed computing device, and a display of a mobile computing device. In another embodiment, the shared display means further includes a mobile display. In yet another embodiment, the shared display means is implemented as a mobile display. The mobile display is, preferably, a touch screen display. In a preferred embodiment, the mobile display is adapted to display a keyboard. The mobile display, preferably, includes at least one video input/output port and at least one audio input/output port.

In a preferred embodiment, the access control means further includes means adapted for receiving an operation request input from at least one associated user. The input is directed to commence a display of data representative of at least one selected electronic document incoming from at least one associated computing device. In this embodiment, the access control means further includes means adapted for selectively commencing a display of the at least one selected electronic document incoming from at least one associated computing device.

The access control means preferably includes authentication means. The authentication means includes means adapted for prompting, via an associated user interface, an associated user for providing identification data representative of an identity of an associated user. The authentication means further includes means adapted for receiving identification data representative of an identity of an associated user, means adapted for storing, in an associated storage, the identification data, and means adapted for selectively generating, via the associated user interface, acceptance data representative of registration of an associated user with respect to the shared display means. In one embodiment, identification data is provided in association with at least one associated computing device.

In accordance with another embodiment of the subject application, there is provided a method for displaying electronic documents incoming from an associated computing device on shared display means. The method begins with receiving an operation request input from at least one associated computing device. Preferably, an associated user is prompted, via an associated user interface, for providing identification data representative of his or her identity. Received identification data representative of an identity of an associated user is stored in an associated storage. When the associated user is authorized, acceptance data representative of registration of an associated user with respect to the shared display means is generated, via the associated user interface. In one embodiment, identification data is provided in association with at least one associated computing device.

Next, data representative of the at least one selected electronic document incoming from at least one associated computing device is communicated to the shared display means for commencing a display thereof. Following display of data representative of the at least one selected electronic document, feedback is provided from the shared display means to at least one associated computing device.

Still other objects and aspects of the subject application will become readily apparent to those skilled in this art from the following description wherein there is shown and described a preferred embodiment of the subject application, simply by way of illustration of one of the best modes suited to carry out the application. As it will be realized by those skilled in the art, the subject application is capable of other different embodiments and its several details are capable of modifications in various obvious aspects all without departing from the scope of the subject application. Accordingly, the drawings and description will be regarded as illustrative in nature and not as restrictive.

BRIEF DESCRIPTION OF DRAWINGS

The accompanying drawings incorporated in and forming a part of the specification, illustrate several aspects of the subject application, and together with the description serve to explain the principles of the subject application. In the drawings.

DETAILED DESCRIPTION OF THE INVENTION

The subject application is directed to display means suitably adapted to interface with a plurality of personal electronic devices. In particular, the subject application is directed to an accessible display system, capable of providing input and output functionality to a plurality of mobile handheld and wearable computing devices, such as personal data assistants, cellular telephones, laptops, and the like.

Figure 1:
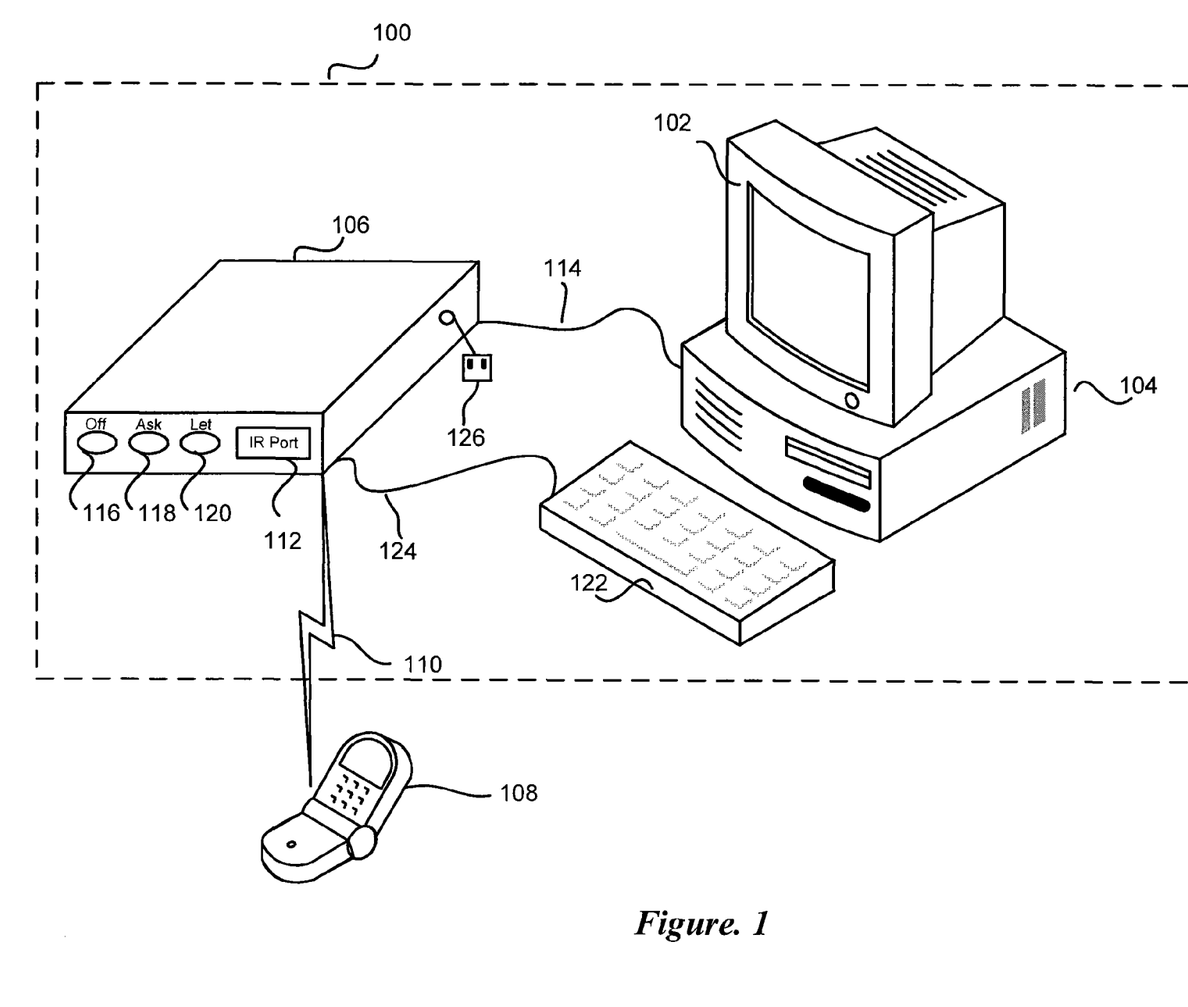
FIG. 1 illustrates an accessible display system with stand alone access control means in accordance with one embodiment of the subject application.

Turning now to FIG. 1, there is shown an accessible display system 100 in accordance with one embodiment of the of the subject application. In the embodiment illustrated in FIG. 1, the accessible display system 100 includes shared display means 102 implemented as a display of a stationary computing device 104. Further included in the accessible display system 100 is stand alone access control means 106. The access control means 106 is in data communication with an associated mobile computing device 108 via communications link 110. As will be appreciated by those skilled in the art, the communications link 110 is any conventional data transport mechanism, including wire-based or wireless data communication mechanisms. As an example, FIG. 1 illustrates the access control means 106 including an infrared port 112, suitably adapted to receive infrared signals from the associated mobile computing device 108. In accordance with one embodiment of the subject application, the port 112 is advantageously adapted to receive RF signals, such as, for example and without limitation, Bluetooth®, IEEE 802.11, or other wireless radio frequency signals from the associated mobile computing device 108.

The access control means 106 is also in data communication with the shared display means 102. Data communication between the access control means 106 and the shared display means 102 is illustrated in FIG. 1 as a wire-based communication 114. However, as will be apparent to those skilled in the art, any other wire-based or wireless data communication mechanisms known in the art are capable of being implemented therein without departing from the scope of the subject application.

The access control means 106 is adapted for selectively allowing access to the shared display means 102 by the associated mobile computing device 108. In the exemplary embodiment illustrated in FIG. 1, the access control means 106 is capable of being set to one of at least three modes:

1). "Off"=The shared display means 102 is dedicated to use by the user of the stationary computing device 104.

2). "Let"=The shared display means 102 will switch to the associated mobile computing device 108 when it approaches.

3). "Ask"=The user of the stationary computing device 104 will receive an alert on the screen after receipt of the operation request input that prompts the user associated with the stationary computing device 104 to make a decision on switching the shared display means 102 to the associated mobile computing device 108.

Thus, the shared display means 102 includes mode indicators, illustrated in FIG. 1 as the "Off" indicator 116, the "Ask" indicator 118, and the "Let" indicator 120. It will be appreciated by those skilled in the art that the mode indicators 116-120 are equally capable of implementation as suitable switches, thereby enabling a user associated with the stationary computing device 104 to physically set the access allowed for an associated mobile computing device 108. Those skilled in the art will appreciate that other means of setting the access are capable of implementation in accordance with the subject application. For example, the accessible display system 100 is capable of including authentication means (not shown in FIG. 1).

A skilled artisan will appreciate that the authentication means is capable of being implemented using suitable software and hardware well known in the art. As will be recognized by those skilled in the art, the authentication means is capable of including means adapted for prompting, via an associated user interface, an associated user of the at least one associated computing device for providing identification data representative of an identity of an associated user. The authentication means, preferably, further includes means adapted for receiving identification data representative of an identity of an associated user, means adapted for storing, in an associated storage, the identification data in association with the at least one associated computing device, and means adapted for selectively generating, via the associated user interface, acceptance data representative of registration of an associated user with respect to the shared display means.

In the embodiment illustrated in FIG. 1, the accessible display system 100 includes a shared input device, such as a shared keyboard 122. The shared keyboard 122 is in data communication with the access control means 106. Data communication between the access control means 106 and the shared keyboard 122 is illustrated in FIG. 1 as a wire-based communication 124. However, as will be apparent to those skilled in the art, any other wire-based or wireless data communication mechanisms known in the art are equally capable of being implemented in accordance with the subject application.

The accessible display system 100 is capable of further including a power supply, which in the embodiment of FIG. 1 is represented as an external power supply 126. Those skilled in the art will realize that the power supply is capable of advantageously being implemented as a suitable internal power supply, as known in the art.

Figure 2:
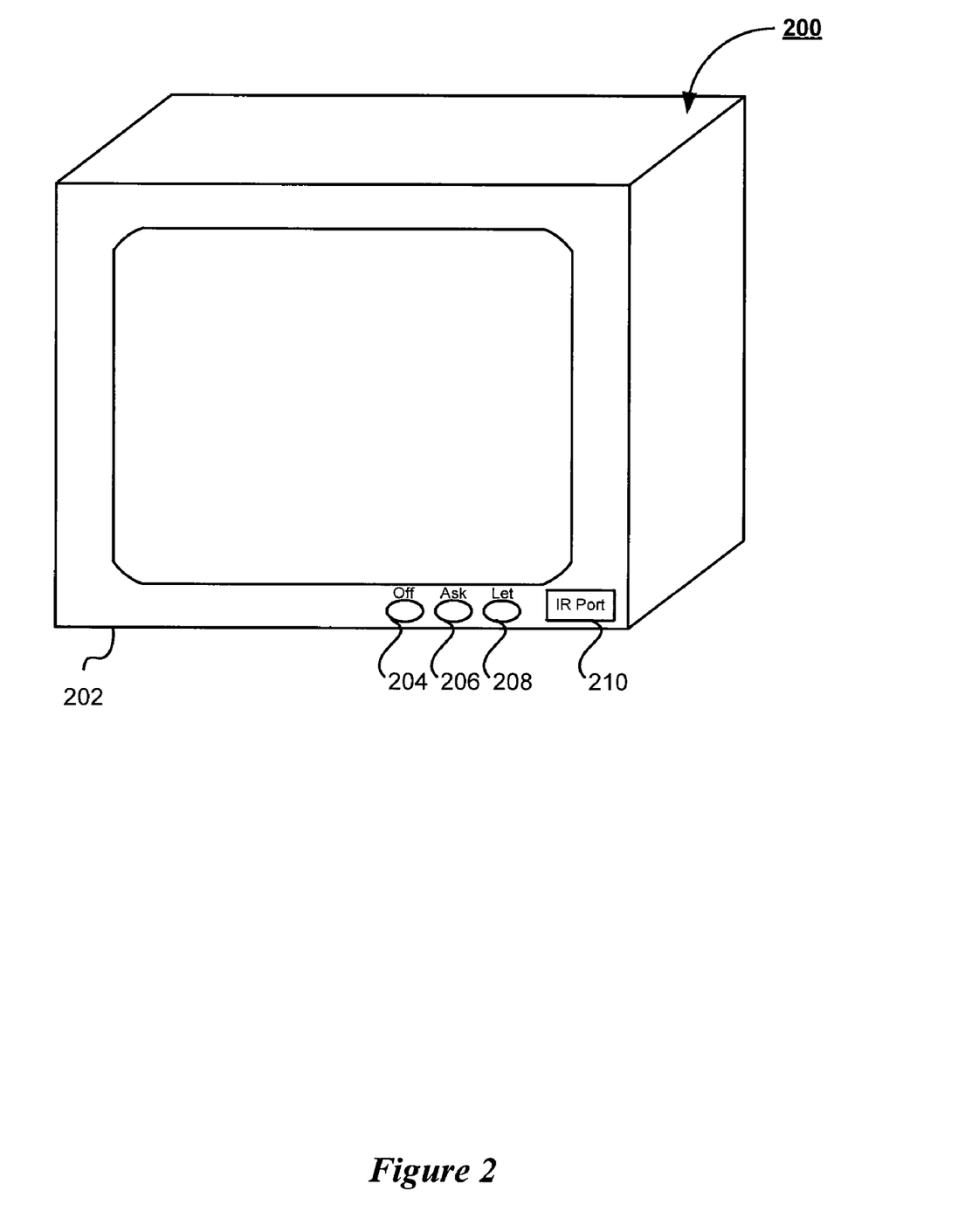
FIG. 2 shows an accessible display system with built-in access control means in accordance with another embodiment of the subject application.

Turning now to FIG. 2, there is shown an accessible display system 200 with built-in access control means 202 in accordance with another embodiment of the subject application. In this embodiment, the access control means 202 includes indicators 204, 206, and 208 corresponding to the indicators 116, 118, and 120 as described above with respect the access control means 106 shown in FIG. 1.

Those of ordinary skill in the art will understand that the indicators 204-208 are advantageously capable of functioning as selection components. Thus, a user of an associated mobile computing device using the accessible display system 200 is capable of selecting the desired function to preclude others from accessing the display system 200 automatically. The user is also capable of being prompted to authorize or negate a request for access to the display 200 by another user, or to allow any mobile user to have access to the display 200. It will be understood by those skilled in the art that a default setting for the display 200 depicted in FIG. 2 would have the "Let" 208 function enabled, thereby allowing users to access the display 200. When the display 200 is not implemented in the standalone function, i.e., it is the principle display means for a desktop computer (not shown in FIG. 2), the other functions, "Off" 204, or "Ask" 206, are capable of being set as the default position of the display 200 in accordance with user desires.

FIG. 2 illustrates the access control means 202 including an infrared port 210, suitably adapted to receive infrared signals from an associated mobile computing device (not shown in the drawing). The infrared port 210 is capable of being implemented analogous to that as described with reference to the embodiment depicted in FIG. 1.

Figure 3:
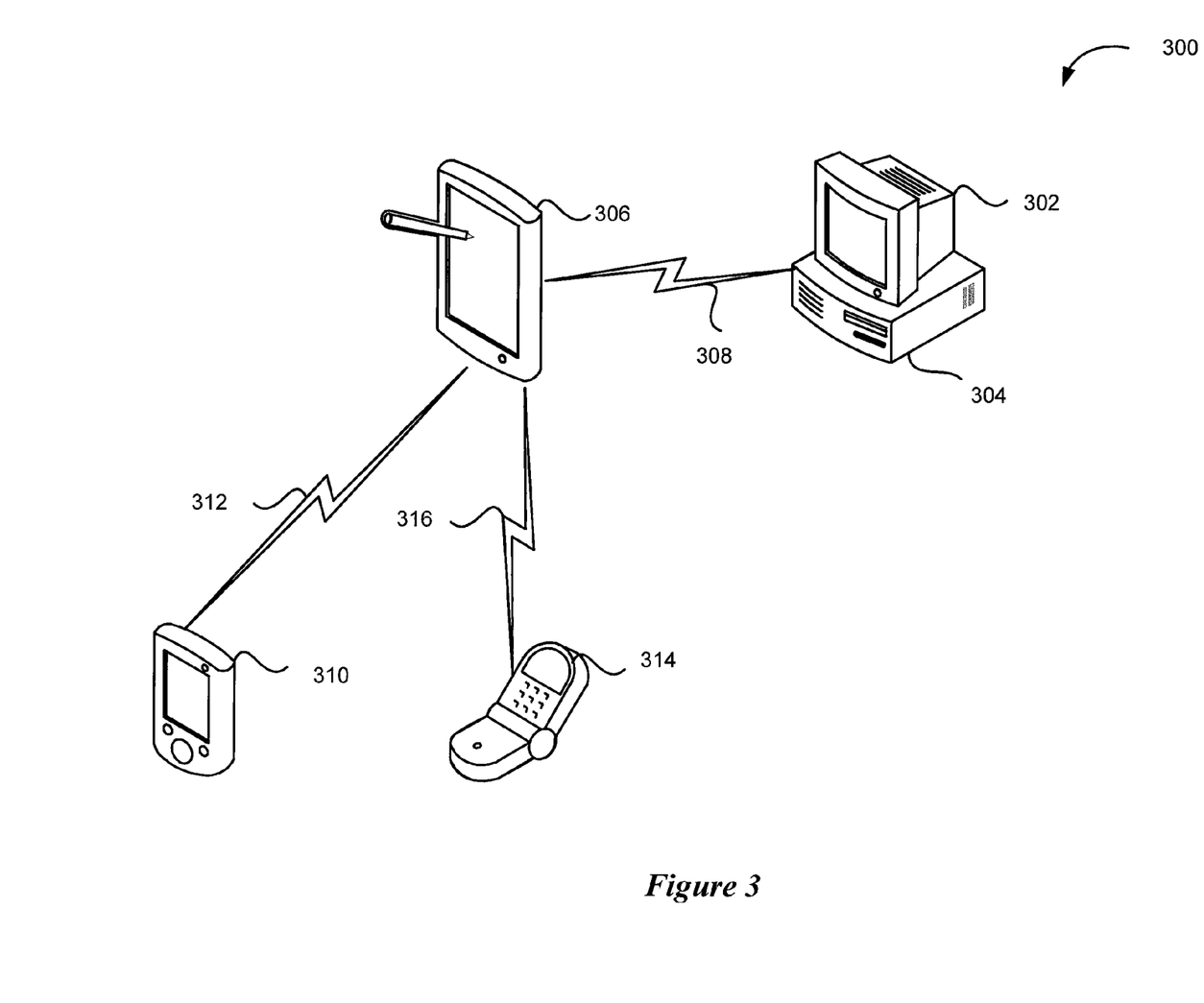
FIG. 3 illustrates an accessible display system including a mobile display in accordance with another embodiment of the subject application.

Turning now to FIG. 3, there is shown an alternate accessible display system 300 of the subject application. As illustrated in FIG. 3, the accessible display system 300 includes a display 302 of a fixed computing device, implemented as a desktop computer 304. Further included in the accessible display system 300 is shared display means advantageously implemented as a mobile display 306. The mobile display 306 is suitably adapted to communicate with the desktop computer 304 via communications link 308. The mobile display 306 is also in data communication with a personal data assistant 310 via communications link 312, and a cellular telephone 314 via communications link 316.

It will be understood by those skilled in the art that devices used in FIG. 3 are for illustration purposes only and any other greater or lesser combination of devices are equally applicable to the subject application. For example and without limitation, the accessible display system 300 is capable of implementation with only a single device, i.e., the desktop computer 304, present to communicate with the mobile display 306.

In the preferred embodiment, the mobile display 306 is advantageously a touch-screen interface. More preferably, the mobile display 306 is implemented in a wireless configuration. The skilled artisan will appreciate that suitable communications links 308, 312, and 316 include, for example and without limitation, infrared, radio frequency communications links, and the like. Those skilled in the art will further appreciate that the mobile display 306, does not require a hard disk drive, large central processing unit, or the like, to function. Thus, the mobile display 306 includes a screen buffer (not shown) suitably adapted to store an image displayed to the associated user until a new image is propagated by the associated computing device for display on the mobile display 306. It will therefore be understood by those skilled in the art that the mobile display 308 does not require the addition of a hard disk drive, large central processing unit, or the like, and therefore is capable of extended operations prior to power source recharge or replacement.

The accessible display system 300 further includes access control means (not shown in FIG. 3) analogous to that illustrated in FIG. 1 as access control means 106. Those skilled in the art will recognize that the access control means is capable of being part of the mobile display 306, or is capable of being a stand alone device. As will be apparent to a skilled artisan, the access control means is also capable of being advantageously shared between any of the mentioned devices. Those skilled in the art will recognize that the accessible display system 300 is capable of including a shared input device, such as a shared keyboard (not shown in FIG. 3), which is in data communication with the access control means.

In accordance with one aspect of the subject application, the mobile display 306 is adapted to display a keyboard (not shown) and the image displayed on the display 302 associated with the desktop computer 304, thereby allowing an associated user of a mobile computing device to simulate actually using the desktop computer 304. The skilled artisan will understand that all major processing is accomplished by the device to which the mobile display 308 is in data communication; however the mobile display 306, in an alternate embodiment, is suitably adapted to perform limited processing operations.

Preferably, the mobile display 306 is a tablet comprising a solid state flat panel screen, including, for example and without limitation, LCD, OLED, or the like. A pen/touch-screen interface enables the associated user to interact with the mobile display 306 and through the mobile display 306, any compatible electronic device, e.g., the desktop computer 304, the personal data assistant 310, the cellular telephone 314, and the like. In one particular embodiment, the mobile display 306 is capable of including one or more additional modifications, thereby improving the multi-media functionality associated therewith. For example and without limitation, the mobile display 306 is capable of being configured with one or more video input/output ports, one or more audio input/output ports, one or more removable storage devices, or the like.

Those skilled in the art will appreciate that the accessible display systems 200 and 300, as illustrated in FIG. 2 and FIG. 3, respectfully, are capable of including authentication means analogous to that described with respect to the accessible display system 100 illustrated in FIG. 1.

Referring now to operation of the accessible display system 100 in accordance with the subject application shown in FIG. 1, the operation of the accessible display system 100 commences by receiving an operation request input from the associated mobile computing device 108. The operation request input is directed to commence a display of data representative of at least one selected electronic document incoming from the mobile computing device 108. As illustrated in FIG. 1, the operation request input is received via the via communications link 110. As described in detail above, depending on the status of the access control means 106, the at least one selected electronic document incoming from the mobile computing device 108 is either directly displayed on the shared display means 102, or it is displayed after an allowance from the associated user of the stationary computing device 104.

Thus, when the desktop user has selected the "Off" option, only the desktop user is allowed use of the input/output devices associated with the desktop computer 104. Alternatively, when the desktop user has initiated the "Ask" option, the access control means 106 will indicate to the desktop computer 104 that the mobile device 108 is requesting use of the input/output components of the desktop computer 104. The desktop user is then able to selectively determine whether to allow the mobile user to use the input/output components. In a further example, when the desktop user has activated the "Let" option, any mobile user is allowed to access to the components associated with the desktop computer 104, without requiring further input on the part of the desktop user. The skilled artisan will appreciate that such a setting is advantageously employed when the desktop user is not currently using one or more components associated with the desktop computer 104.

In a preferred embodiment, when a user of the mobile computing device 108, such as a portable computer, or cell phone as illustrated in FIG. 1, approaches the access control means 106 and requests access to the shared display means 102 coupled to the desktop computer 104, or alternatively to an input device, such as shared keyboard 122, an associated user is prompted, via an associated user interface, for providing identification data representative of his or her identity. Received identification data representative of an identity of an associated user is stored in an associated storage in association with the associated computing device. When the associated user is authorized, acceptance data representative of registration of an associated user with respect to the shared display means is generated, via the associated user interface.

Next, data representative of the at least one selected electronic document incoming from the mobile computing device 108 is communicated to the shared display means 102 for commencing a display thereof. Following display of data representative of the at least one selected electronic document, feedback is provided from the shared display means 102 to the mobile computing device 108.

It will be appreciated by those skilled in the art that when a portable user is using the accessible display system 100, this user is capable of retaining control of it even when another mobile computer approaches. Those skilled in the art will appreciate that alternate negotiation schemes are equally capable of being implemented in accordance with the subject application. In one particular embodiment, the desktop keyboard 122 is also shared by this system. In an alternative embodiment, a connector is capable of being included on the access control means 106 for an additional keyboard so that the desktop user would not have to be disturbed.

An audio input and output system as well as other interface devices can be provided by the accessible display system in accordance with the subject application. A network connection is also capable of inclusion as an additional service of the accessible monitor. Video and data signals are capable of being shared between the accessible display system and the portables by IR (Infrared), RF (Radio Frequency), or other suitable communications medium.

Referring now to the operation of the accessible display system 200 shown in FIG. 2, the operation of the accessible display system 200 is analogous to that as described with reference to the embodiment shown in FIG. 1, as will be apparent to those skilled in the art.

Referring now to operation of the accessible display system 300 in accordance with the subject application shown in FIG. 3, the operation commences by the accessible display system 300 receiving an operation request input from an associated mobile computing device, for example and without limitation, from the personal data assistant 310. The operation request input is directed to commence a display of data representative of at least one selected electronic document incoming from the personal data assistant 310, on the shared display means, which in the embodiment of FIG. 3 is implemented as the mobile display 306. As illustrated in FIG. 3, the operation request input is received via the via communications link 312. When configured to allow access, as discussed above, the access control means (not shown) transmits screen data to the mobile display 306 for display to the associated user of the personal data assistant 310. The associated user of the personal data assistant 310 then uses the mobile display 306 as an input/output device for the various components of the personal data assistant 310, thereby bypassing or augmenting the input/output devices operatively coupled to the personal data assistant 310, e.g., mouse, keyboard, monitor/flat panel display, and the like. Those skilled in the art will appreciate that the mobile display 306 is able to make use of all accessible programs and applications resident on the personal data assistant 310, without having to download such applications to the mobile display 306 itself. Commands and instructions are then sent by the user of the personal data assistant 310 from the mobile display 306 to the personal data assistant 310, whereupon the personal data assistant 310 executes the commands or instructions. For example, the user initiates a word processing application on the mobile display 306. The personal data assistant 310 then transmits the screen image to the mobile display 306, which displays the word processing application to the user. The user then uses the mobile display 306 as a keyboard and/or mouse to manipulate data resident on the personal data assistant 310.

As will be appreciated by those skilled in the art, an authentication procedure is capable of being provided therein, analogous to that as described with reference to the accessible display system 100 illustrated in FIG. 1.

Figure 4:
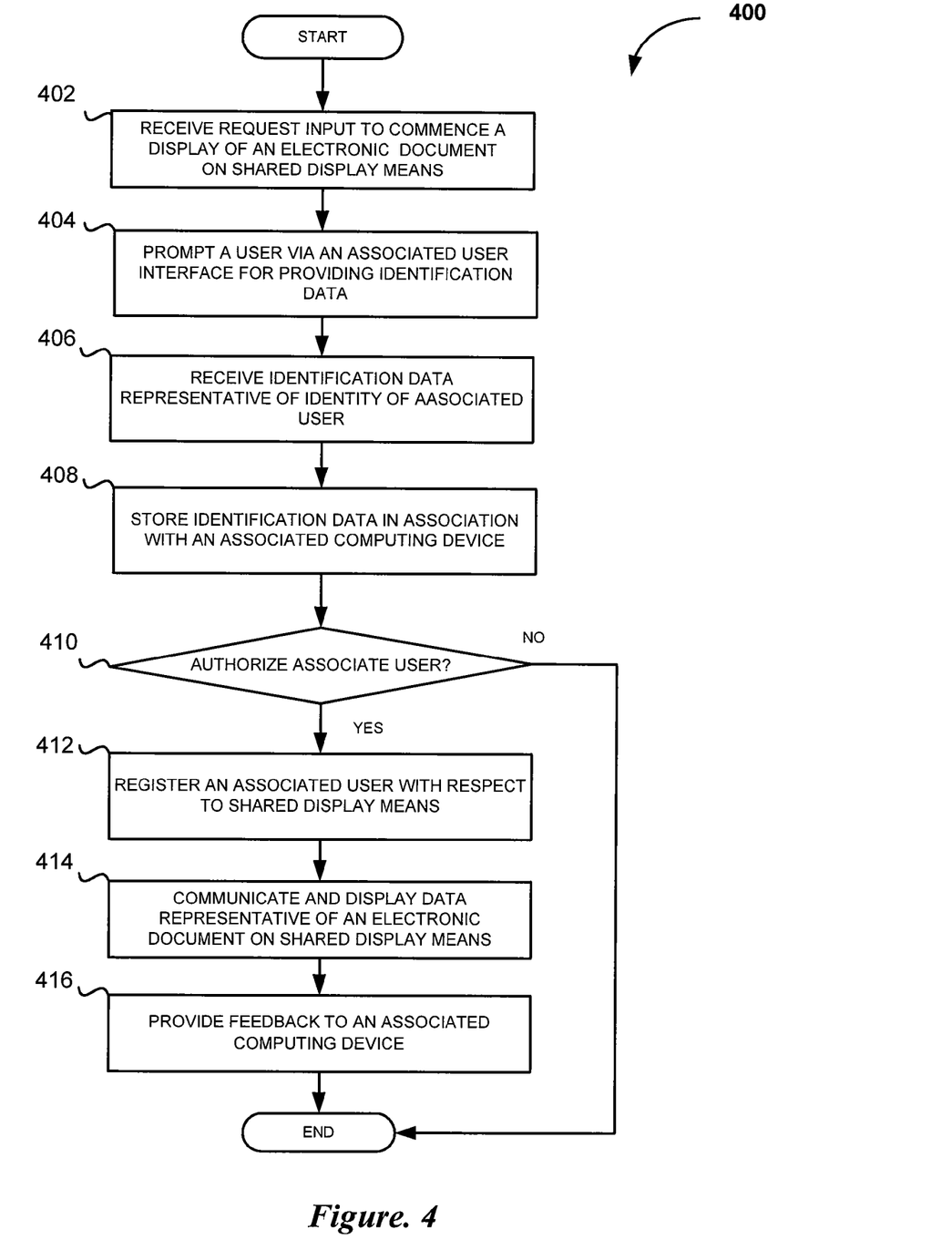
FIG. 4 illustrates a method for displaying electronic documents incoming from an associated mobile computing device on a shared display in accordance with one embodiment of the subject application.

The foregoing description of the preferred embodiments of the subject application illustrated in FIGS. 1, 2, and 3 will better be understood by those skilled in the art when interpreted in conjunction with the methodology illustrated in FIG. 4. Turning now to FIG. 4, there is shown a flowchart 400 depicting a method for displaying electronic documents incoming from an associated computing device on shared display means in accordance with the subject application.

As will be appreciated by those skilled in the art, the flowchart 400 depicts an embodiment of the subject application including an authentication procedure described above. Beginning at step 402, an operation request input is received by an associated user of the desktop computer 104 of FIG. 1 from an associated mobile computing device 108. The request input is directed to commence a display of data representative of at least one selected electronic document incoming from the associated mobile computing device 108.

Next, at step 404 an associated user is prompted, via an associated user interface, for providing identification data representative of his or her identity. At step 406 identification data representative of an identity of an associated user is received and stored thereby at step 408 in an associated storage in association with the associated computing device. At step 410 a determination is made, whether the associated user of the mobile computing device 108 is authorized to use the shared display means 102. If the associated user of the mobile computing device 108 is not authorized, the process terminates. In the event that the associated user of the mobile computing device 108 is authorized, the associated user is registered in association with the associated computing device with respect to the shared display means 102. Thus, communication is allowed, and data representative of the at least one selected electronic document incoming from the mobile computing device 108 is communicated to the shared display means 102 for commencing a display thereof at step 414. When data representative of an electronic document has been displayed on the shared display 102 at step 414, a feedback is provided to the associated mobile computing device 108 from the shared display 102 at step 416 enabling interactive handling of the associated electronic document.

The methodology illustrated in FIG. 4 is described with respect to the embodiment illustrated in FIG. 1. However, as will be apparent to those skilled in the art, the methodology described herein equally pertains to the embodiments illustrated in FIG. 2 and FIG. 3, that is to the embodiments when the shared display means is implemented as monitor of a desktop computer, a laptop computer, and the like, or as a mobile display.

As would also be evident to a skilled artisan, although as described herein the request to initiate access to shared display means, is sent from a mobile computing device, it is equally applicable to send the request from the mobile display to an associated computing device. Those skilled in the art will appreciate that the latter may come in practical, for example and without limitation, in a household environment, in a hospital environment, in an office environment, and the like.

The subject application extends to computer programs in the form of source code, object code, code intermediate sources and object code (such as in a partially compiled form), or in any other form suitable for use in the implementation of the subject application. Computer programs are suitably standalone applications, software components, scripts or plug-ins to other applications. Computer programs embedding the subject application are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the subject application principles as described, will fall within the scope of the subject application.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed:

1. An accessible display system comprising:
   a first computing device;
   a display device operatively coupled with the first computing device; and
   access control means in data communication with the display device and with the first computing device;
   wherein the access control means is further in data communication with a plurality of associated mobile computing devices;
   wherein the access control means is adapted to operate in one of a first operation mode, a second operation mode, and a third operation mode in accordance with a control mode input received from a user of the first computing device or the plurality of associated mobile computing devices;
   wherein the access control means is adapted to control access to the display device, in accordance with the operation mode of the access control means, by selectively allowing exclusive access to the display device by only one of the first computing device or the plurality of associated mobile computing devices at a time as a currently associated computing device, wherein:
   in the first operation mode, the access control means is adapted to deny access to the display device by a second computing device while the currently associated computing device has exclusive access to the display device;
   in the second operation mode, the access control means is adapted to allow exclusive access to the display device by the second computing device by switching access from the currently associated computing device to the second computing device; and
   in the third operation mode, the access control means is adapted to: communicate a request from the second computing device for access to the display device to a user of the currently associated computing device; to receive decision data for the access from the user of the currently associated computing device; and to grant exclusive access to the display device by the second computing device by switching access from the currently associated computing device to the second computing device responsive only to the decision data of the user of the currently associated computing device granting permission to the second computing device; and
   wherein the display device is adapted for providing feedback to the currently associated computing device.

2. The accessible display system of claim 1 wherein the currently associated computing device is at least one of: a mobile computing device, or a fixed computing device.

3. The accessible display system of claim 1 wherein the display device includes at least one of: a display of a previously associated computing device, or a mobile display.

4. The accessible display system of claim 3 wherein the mobile display is without a central processing unit or a disk drive.

5. The accessible display system of claim 4 wherein the mobile display is a touch screen display.

6. The accessible display system of claim 4 wherein the mobile display is adapted to display a keyboard.

7. The accessible display system of claim 1 wherein the display device is a mobile display.

8. The accessible display system of claim 7 wherein the mobile display is a touch screen display.

9. The accessible display system of claim 8 wherein the mobile display is adapted to display a keyboard.

10. The accessible display system of claim 1 wherein the access control means further comprises:
    means adapted for receiving an operation request input from at least one associated user, which input is directed to commence a display of data representative of at least one selected electronic document incoming from the currently associated computing device; and
    means adapted for selectively commencing a display of data representative of the at least one selected electronic document incoming from the currently associated computing device.

11. The accessible display system of claim 10 wherein the access control means further comprises authentication means, which authentication means comprises:
    means adapted for prompting, via an associated user interface, an associated user for providing identification data representative of an identity of an associated user;
    means adapted for receiving identification data representative of an identity of an associated user;

means adapted for storing, in an associated storage, user identification data; and means adapted for selectively generating, via the associated user interface, acceptance data representative of registration of an associated user with respect to the display device.

12. The accessible display system of claim 1 wherein the access control means is at least one of built-in access control means, or stand alone access control means with respect to the display device.

13. The accessible display system of claim 1 wherein the access control means is adapted to:

selectively determine the associated computing device approaching the access control means and, selectively allow the exclusive access to the display device by the associated computing device in accordance with the associated computing device approaching the access control means.

14. A method for displaying electronic documents incoming from an associated mobile computing device on a display device of an accessible display system, the method comprising:

selecting a mode of operation from a first operation mode, a second operation mode, and a third operation mode in accordance with a control mode input received from a user of the associated mobile computing device or the accessible display system;

granting exclusive control over the display device, in accordance with the selected operation mode, to an associated mobile computing device among a plurality of associated mobile computing devices as a currently associated computing device, wherein:

in the first operation mode, access to the display device by a second associated mobile computing device is denied while the currently associated computing device has exclusive access to the display device;

in the second operation mode, access to the display device by the second associated mobile computing device is allowed by switching access from the currently associated computing device to the second associated mobile computing device; and in the third operation mode, access to the display device by the second associated mobile computing device is allowed by switching access from the currently associated computing device to the second associated mobile computing device responsive to a user of the currently associated computing device receiving a request from the second associated mobile computing device for access from the second associated mobile computing device and granting permission to the second computing device;

receiving an operation request input from at least one associated user, which operation request input is directed to commence a display of data representative of at least one selected electronic document;

selectively communicating data representative of the at least one selected electronic document incoming from the currently associated computing device to the display device for commencing a display thereof; and providing feedback from the display device to the currently associated computing device.

15. The method for displaying electronic documents of claim 14 further comprising:

prompting, via an associated user interface, an associated user for providing identification data representative of an identity of an associated user;

receiving identification data representative of an identity of an associated user;

storing, in an associated storage, user identification data; and selectively generating, via the associated user interface, acceptance data representative of registration of an associated user with respect to the display device.

16. The method for displaying electronic documents of claim 15 wherein the identification data is provided in association with the associated computing device.

17. The method for displaying electronic documents of claim 14 wherein the display device includes at least one of: a display of a fixed computing device, a display of a mobile computing device, or a mobile display.

18. The method for displaying electronic documents of claim 14 further including selectively determining the associated computing device approaching an access control means and, selectively allowing the exclusive access to the display device by the associated computing device in accordance with the associated computing device approaching the access control means.

19. A computer-implemented method displaying electronic documents incoming from an associated computing device on a display device of an accessible display system, the method comprising:

selecting a mode of operation from a first operation mode, a second operation mode, and third operation mode in accordance with a control mode input received from a user of the associated computing device or the accessible display system;

granting exclusive control over the display device, in accordance with the selected operation mode, to an associated computing device among a plurality of associated computing devices as a currently associated computing device, wherein:

in the first operation mode, access to the display device by a second associated computing device is denied while the currently associated computing device has exclusive access to the display device;

in the second operation mode, access to the display device by the second associated computing device is allowed by switching access from the currently associated computing device to the second associated computing device; and in the third operation mode, access to the display device by the second associated computing device is allowed by switching access from the currently associated computing device to the second associated computing device responsive to a user of the currently associated computing device receiving a request from the second associated computing device for access from the second associated computing device and granting permission to the second computing device;

receiving an operation request input from at least one associated user, which operation request input is directed to commence a display of data representative of at least one selected electronic document incoming from at least one associated computing device;

selectively communicating data representative of the at least one selected electronic document incoming from the currently associated computing device to the display device for commencing a display thereof; and providing feedback from the display device to the current associated computing device.

20. The computer-implemented method for displaying electronic documents of claim 19 further comprising the steps of:

prompting, via an associated user interface, an associated user for providing identification data representative of an identity of an associated user;

receiving identification data representative of an identity of an associated user;

storing, in an associated storage, user identification data; and selectively generating, via the associated user interface, acceptance data representative of registration of an associated user with respect to the display device.

21. The computer-implemented method for displaying electronic documents of claim 20 wherein the identification data is provided in association with the associated computing device.

22. The computer-implemented method for displaying electronic documents of claim 19 wherein the display device includes at least one of: a display of a fixed computing device, a display of a mobile computing device, or a mobile display.

23. The computer-implemented method for displaying electronic documents of claim 19 further including:

selectively determining the associated computing device approaching an access control means associated with the display device; and, selectively allowing the exclusive access to the display device by the associated computing device in accordance with the determining of the associated computing device approaching the access control means.

* * * * *